United States Patent [19]
Sangster

[11] 3,737,683
[45] June 5, 1973

[54] BUCKET BRIDGE DELAY LINE WITH ERROR COMPENSATION

[75] Inventor: Frederik Leonard Johan Sangster, Emmasingel, Eindhoven, Netherlands

[73] Assignee: U.S. Philips Corporation, New York, N.Y.

[22] Filed: Mar. 13, 1972

[21] Appl. No.: 234,365

Related U.S. Application Data

[63] Continuation of Ser. No. 88,672, Nov. 12, 1970, abandoned.

[30] Foreign Application Priority Data

Sept. 25, 1970 Netherlands ........................7014137

[52] U.S. Cl. ...............307/293, 307/221 D, 307/246, 307/251, 307/304

[51] Int. Cl. ..............................................H03k 17/26

[58] Field of Search .......................307/221 R, 221 C, 307/223 R, 223 C, 246, 293, 251, 304

[56] References Cited

UNITED STATES PATENTS

| | | | |
|---|---|---|---|
| 3,252,009 | 5/1966 | Weimer | 307/221 C |
| 3,474,260 | 10/1969 | Frohbach | 307/221 R |
| 3,546,490 | 12/1970 | Sangster | 307/246 X |

*Primary Examiner*—Stanley D. Miller, Jr.
*Attorney*—Frank R. Trifari

[57] ABSTRACT

A capacitive delay device comprising a sequence of capacitances, in which information is transferred by charge transfer. The device is provided with at least one auxiliary store which has been connected between a first and a second capacitance, whilst after a charge transfer between the capacitances a residual charge transfer takes place between the first capacitance and the auxiliary store, after which the charge stored in the auxiliary store and in the second capacitance is transferred to a capacitance succeeding the second capacitance.

4 Claims, 4 Drawing Figures

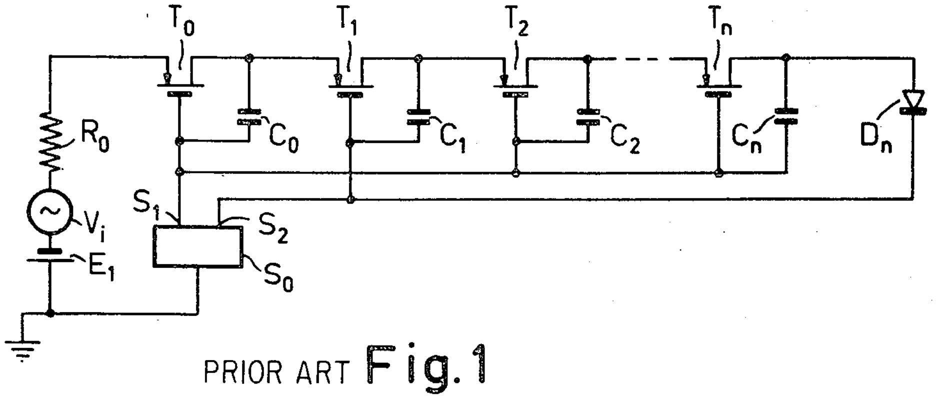
PRIOR ART Fig.1
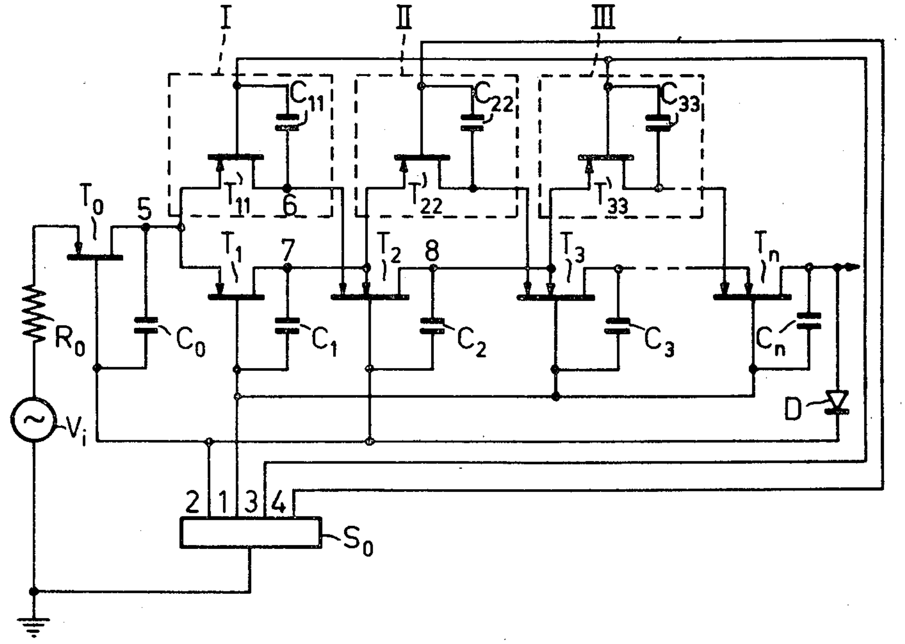
Fig.3
INVENTOR.
FREDERIK L.J. SANGSTER
BY
AGENT

INVENTOR.
FREDERIK L.J. SANGSTER
BY
AGENT

INVENTOR.
FREDERIK L.J. SANGSTER
BY
AGENT

BUCKET BRIDGE DELAY LINE WITH ERROR COMPENSATION

This is a continuation of application Ser. No. 88,672, filed Nov. 12, 1970, now abandoned.

The invention relates to a device for delaying a train of signal samples of an electrical signal. The device comprises a sequence of stages which each include a first and a second capacitance interconnected by means of the main current path of at least one transistor. The second capacitance of each stage forms the first capacitance of the succeeding stage, while input electrode circuit of the transistor includes the first capacitance and its output electrode circuit includes the second capacitance. A switching voltage source is arranged to be connected between the control electrode of the transistor and that terminal of the first capacitance which is not connected to the input electrode of the transistor. In a known arrangement of this kind, as is described in Netherlands Patent Application No. 6,805,705, corresponding to U.S. application, Ser. No. 817,690, filed Apr. 21, 1969, the transistor is a field effect transistor. The field effect transistors are interconnected in groups so as to form junction points to which switching signals are applied which are ascendingly shifted in phase in the order of the numbers of the junction points.

Applicant recognizes the problem that when a large number of stages are used satisfactory operation is interfered with by the fact that in each stage of the arrangement a slight degradation of sudden voltage changes occurs. This means that when the input voltage abruptly changes from 0 volts to $V$ volts, the output signal at the output of the arrangement changes from 0 volts to $(V - \delta)$ volts, where $\delta$ is the error voltage. If subsequently the input signal remains at the value of $V$ volts, the output signal will also assume this value. The said effect deleteriously affects the frequency characteristic of the device.

It is an object of the present invention to provide a solution of the said problem and a device according to the invention is characterized in that in at least several stages the first capacitance is also connected through an auxiliary store to the second capacitance of a succeeding stage, the said auxiliary store being controlled so that a charge transfer between the first capacitance and the auxiliary store takes place only after a charge transfer has taken place between the first and second capacitances, the charges stored in the auxiliary store and in the second capacitance being then transferred to the second capacitance of the succeeding stage.

The invention is based on the recognition that the said signal degradation is due to the fact that the threshold voltage of a transistor depends on the transferred signal value $\Delta V$. When a comparatively small number of stages is used this effect will not be troublesome, but when a large number of stages, for example several hundreds of stages, are used it will be highly troublesome. The effect will be particularly strong when the transistors used are field effect transistors. This is due to the fact that electrostatic reaction takes place from the drain electrode by way of the substrate on the channel between the source electrode and the drain electrode of the field effect transistor used, and that on the other hand, the length of the channel slightly depends on the voltage at the drain electrode. In field effect transistors having a high-resistivity substrate the electrostatic reaction is the dominant factor, whereas in field effect transistors having a low-resistivity substrate the second effect is dominant.

An embodiment of the invention will now be described, by way of example, with reference to the accompanying diagrammatic drawings, in which:

FIG. 1 shows the known arrangement,

FIG. 3 shows an embodiment of an arrangement according to the invention.

In the known delay device shown in FIG. 1, the main current paths of the field effect transistors $T_0, T_1, \ldots, T_n$ are connected in series. A capacitor $C_0$ has been connected between the drain and the gate of the transistor $T_0$. A capacitor C1 has been connected between the drain and the gate of the transistor $T_1$. A capacitor $C_n$ has been connected between the drain and the gate of the transistor $T_n$. The gate of the transistor $T_1$ has been connected to an output $S_2$ of a switching voltage source $S_0$. The gates of the transistors $T_0$ and $T_n$ have been connected to an output $S_1$ of the switching voltage source $S_0$. A diode $D_n$ has one terminal connected to the drain of the transistor $T_n$ and the other terminal connected to the output $S_2$ of the switching voltage source $S_0$. The source of the transistor $T_0$ has been connected to a point of constant potential through the series combination of a resistor $R_0$, an input votage source $V_i$ and a direct-voltage source $E_1$.

Figure 2:
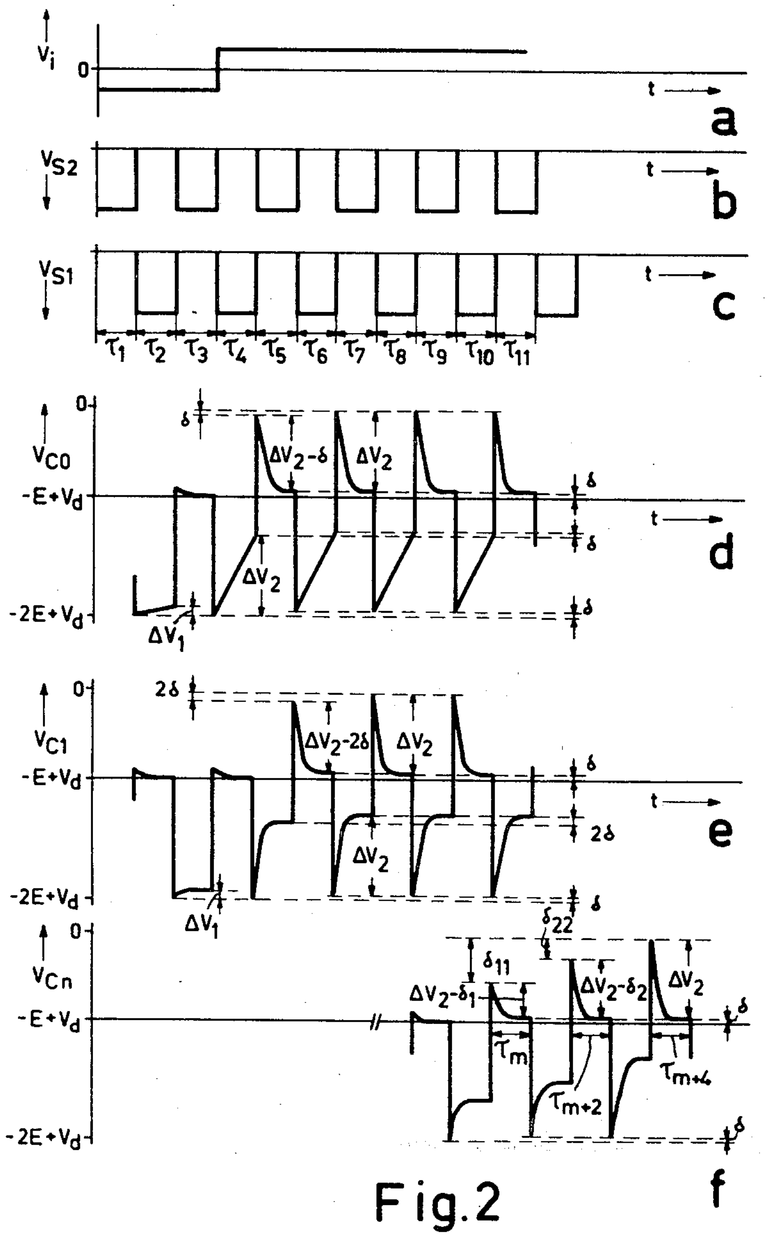
FIG. 2 shows the voltage wave forms at different points in the known arrangement.

The operation of the known arrangement will be described with reference to FIG. 2. FIGS. 2*a* and 2*b* show the voltage waveforms at the outputs $S_2$ and $S_1$ respectively. These voltages are symmetrical square-wave voltages having a maximum of 0 volts and a minimum of $-$E volts. During the time in which the voltage at the point $S_1$ is negative with respect to ground, i.e. during time intervals $\tau_2$, $\tau_4$, $\tau_6$ and $\tau_8$ in FIG. 2*C*, information about the value of the input signal $V_i$ is transferred to the capacitor $C_0$. During the time interval $\tau_2$ the input signal $Vi$ is small, whereas during the time interval $\tau_4$ and the following time intervals the input signal $V_i$ is large. During the time interval $\tau_2$ there will flow through the transistor $T_0$ a current of about $V_i/R_0$ amperes, where $V_i$ is the value of the input signal during the time interval $\tau_2$ under consideration and $R_0$ is the resistance of the resistor of FIG. 1. The said current will cause the voltage at the drain of said transistor $T_0$ to increase by an amount $\Delta v_1$, see FIG. 2*d*. During the time interval $\tau_3$ the capacitor $C_0$ is discharged through the transistor $T_1$ until the voltage across this capacitor has become equal to $-(E-V_d)$ volts, where $V_d$ is the threshold voltage of the transistor $T_1$, the value of this threshold voltage being determined by the signal value $\Delta V_1$. During the time interval $\tau_4$ charge is again supplied to the capacitor $C_0$ through the transistor $T_0$, so that the voltage at the drain of the transistor $T_0$ will rise by an amount $\Delta v_2$, see FIG. 2*d*. During the time interval $\tau_5$ the capacitor $C_0$ is discharged through the transistor $T_1$, until the voltage across this capacitor has become equal to $-(E-V'_d)$ volts, where $V'_d$ is that theshold voltage of the transistor $T_1$ which is associated with the signal value $\Delta V_2$. It has been found that the threshold voltage $V'_d$ associated with the signal value $\Delta V_2$ exceeds the threshold voltage $V_d$ associated with the signal value $\Delta V_1$ by an amount of $\delta$ volts. This means that the voltage drop across the capacitor $C_0$ which occurs during the time interval $\tau_5$ will be equal to $(\Delta V_2 - \delta)$ volts instead of to $\Delta V_2$ volts. At the instant at which the time interval $\tau_6$ begins the voltage at the drain of the transistor $T_0$ will be equal to $\{-(2E-V_d)+\delta\}$ volts, see FIG. 2*d*. At the end of the said time interval, the voltage at the drain of the transistor $T_0$ will be equal to $\{-(2E-V_d)+\delta+\Delta V_2\}$ volts. Consequently, the voltage drop across the capacitor $C_0$ will be equal to $\Delta V_2$ volts during this time interval.

During the time interval $\tau_3$ the capacitor $C_1$ is charged throught the transistor $T_1$ until the voltage across this capacitor has risen by an amount of $\Delta V_1$ volts, see FIG. 2*e*. During the time interval $\tau_4$ the capacitor $C_1$ is discharged through the transisitor $T_2$ until the voltage across this capacitor has become equal to $-(E-V_d)$ volts, where $V_d$ is the threshold voltage of the transistor $T_2$ associated with the signal value $\Delta V_1$. During the time interval $\tau_5$ the capacitor $C_1$ is charged through the transistor $T_1$. The voltage rise across the capacitor $C_1$ will be equal to the voltage drop across the capacitor $C_0$ during the time interval under consideration. Consequently, the said voltage rise will be equal to $(\Delta V_2 - \delta)$ volts. During the time interval $\tau_6$ the capacitor $C_1$ is discharged through the transistor $T_2$ until the votage across this capacitor has become equal to $-(E-V''_5)$ volts, where $V''_d$ is the threshold voltage of the transistor $T_2$ associated with the signal value $(\Delta V_2 - \delta)$. Since $\delta$ is much smaller than $\Delta V_2$, we have to a good approximation : $V''_d = V'_d$. This means that the voltage drop across the capacitor $C_1$ during the time interval $\tau_6$ will be equal to $(\Delta V_2 - 2\,\delta)$ volts instead of to $\Delta V_2$ volts, as it should have been. A simple calculation shows that the voltage drop across the capacitor $C_n$ of the capacitive store of FIG. 1, which voltage drop corresponds to the voltage drop $(\Delta V_2 - \delta)$ volts across the capacitor $C_0$ during the time interval $\tau_5$, will be equal to $(\Delta V_2 - n.\,\delta)$ volts, where $n$ is the number of the capacitor $C_n$. However, this will hold only if $n.\,\delta$ is small compared with $\Delta V_2$. If $n.\,\delta$ becomes comparable to $\Delta V_2$, i.e. if $n$ is large, the corresponding voltage drop will be equal to $(1-\delta)^n$ volts. However, if $n.\,\delta$ becomes comparable to the signal value $\Delta V_2$, second-order and third-order effects also will occur. This means that in contradistinction to the example discussed with reference to FIGS. 2*d* and 2*e* in which one signal value only was not correct (see the interval $\tau_5$ of FIG. 2*d* and the interval $\tau_6$ in FIG. 2*e*) at least two successive signal values will not be correct, as is shown diagrammatically in FIG. 2*f*. In this Figure the signal values during the intervals $\tau_m$ and $\tau_{m+2}$ are not correct. During the time interval $\tau_m$ the signal value is equal to $(\Delta V_2 - \delta_{11})$ volts, and during the time interval $\tau_{m+2}$ the signal value is equal to $(\Delta V_2 - \delta_{22})$ volts. Not before the interval $\tau_{m+4}$ will the signal value be correct and equal to $\Delta V_2$ volts.

Figure 4:
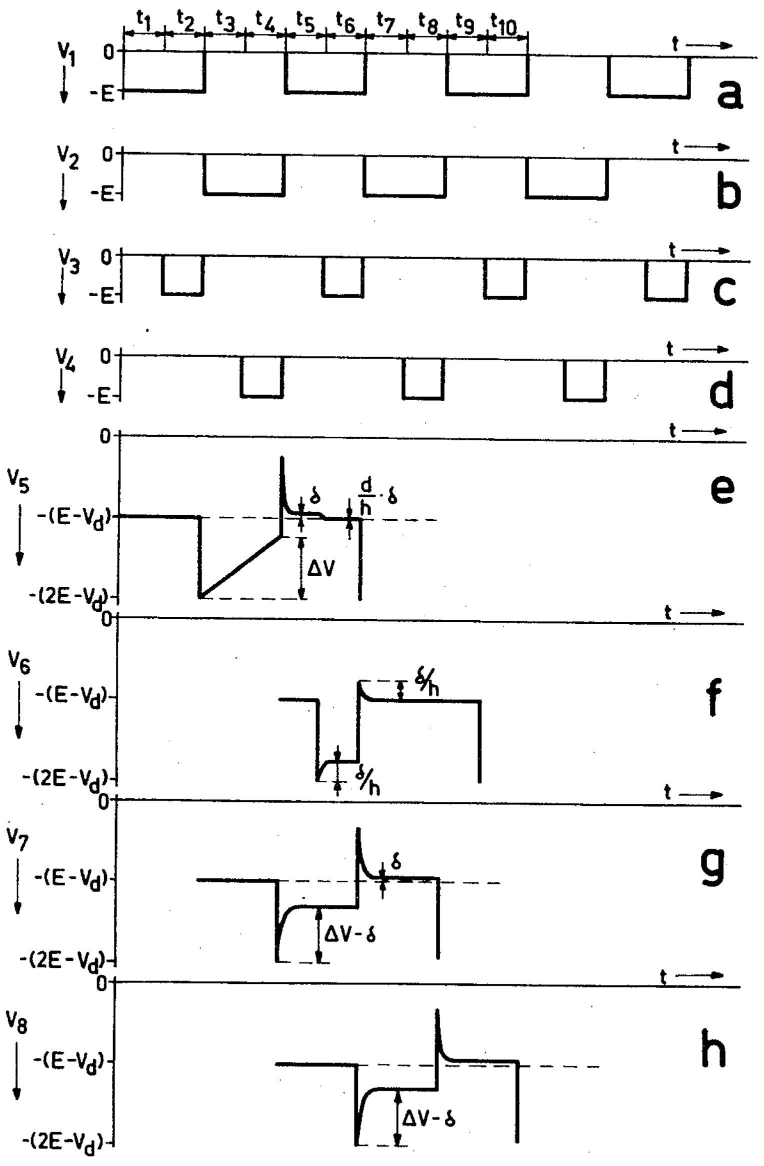
FIG. 4 shows the voltage wave forms at various points in the arrangement of FIG. 3.

FIG. 3 shows a delay device according to the invention. The main current paths of transistors $T_0$, $T_1$, $T_2$, $T_3$, . . . , $T_n$ have been connected in series. The source of the transistor $T_0$ has been connected to a point of constant potential through the series combination of a resistor $R_0$ and a signal voltage source $V_i$. Storage capacitor $C_0$, $C_1$, $C_2$, $C_3$ and $C_n$ have been included between the drain and gate electrodes of the transistors $T_0$, $T_1$, $T_2$, $T_3$ and $T_n$ respectively. The gates of the transistors $T_0$ and $T_2$ have been connected to a signal output 2 of a signal voltage source $S_0$, and the gates of the transistors $T_1$, $T_3$ and $T_n$ have been connected to an output 1 of the switching voltage source $S_0$. A diode D has been connected between the drain of the transistor $T_n$ and the output 2 of the switching voltage source $S_0$. The capacitor $C_0$ has also been connected, through an auxiliary store I, to an additional source of the transistor $T_2$. The capacitor $C_1$ has also been connected, through an auxiliary stor II, to an additional source of the transistor $T_3$, and the capacitor $C_2$ has also been connected, through an auxiliary store III, to an additional source of the transistor $T_n$. The auxiliary stores each include a field effect transistor between the gate and drain of which a capacitor has been included. The gates of transistors $T_{11}$ and $T_{33}$ of the store stages I and III respectively have been connected to the output 3 of the switching voltage source $S_0$, and the gate of a transistor $T_{22}$ of the store stage II has been connected to the output 4 of the switching voltage source $S_0$. The operation of circuit arrangement shown in FIG. 3 will be described with reference to FIG. 4.

It is assumed that during the time intervals preceeding the time interval $t_1$ the input signal $V_i$ has an amplitude of 0 volts. This means that during these time intervals the transistor $T_0$ was non-conductive, and no charge flowed into the capacitor $C_0$. Hence, during the time intervals $t_1$ and $t_2$ the voltage across the capacitor $C_0$ will be equal to $-(E - V_0)$ volts, where $V_0$ is the threshold voltage of the transistor $T_1$, see FIG. 4*e*. During the time intervals $t_3$ and $t_4$ the voltage at the gate of the transistor $T_0$ is equal to $-E$ volts, see FIG. 4*b*. It is further assumed that during the time intervals $t_3$ and $t_4$ the input signal has a positive amplitude differing from 0. During the said intervals the transistor $T_0$ will be conductive. At the end of the interval $t_4$ the voltage across the capacitor $C_0$ will have increased by an amount of $\Delta V$ volts, see FIG. 4*e*. During the time intervals $t_5$ and $t_6$ the voltage at the gate of transistor $T_1$ is equal to $-E$ volts, see FIG. 4*a*, and the voltage at the gate of the transistor $T_0$ is equal to 0 volts. During the said time intervals the transistor $T_1$ is conductive and the transistor $T_0$ is non-conductive. During the time interval $t_5$ the capacitor $T_0$ is discharged until the voltage at a point 5 of the circuit arrangement has become equal to $-(E-V_0+\delta)$ volts, see FIG. 4*e*, where $(V_0 - \delta)$ is the threshold voltage of the transistor $T_1$ associated with the sudden signal change $\Delta V$. A voltage $V_7$ at a point 7 of the circuit arrangement will have increased by an amount $(\Delta V - \delta)$ *volts during the time interval under consideration, see FIG. 4g*. During the time interval $t_6$ the transistor $T_{11}$ will be conductive. During this time interval the charge $\delta$ .C remaining in the capacitor $C_0$ during the time interval $t_5$ is transferred substantially entirely to the capacitor $C_{11}$ through the transistor $T_{11}$. As a result, a voltage $V_6$ at a point 6 of the circuit arrangement will rise by an amount of $\delta/h$ volts. Owing to this rise the threshold voltage of the transistor $T_{11}$ will slightly increase, so that the final voltage across the capacitor $C_0$ will be equal to $-(E-V_0+d/h\cdot\delta)$ volts, where $d$ is $\delta/V_0$. Thus, the provision of the auxiliary store I connected between the capacitor $C_0$ and the capacitor $C_2$ ensures that the error which occurs in the reference voltage across the capacitor $C_0$ has been reduced by a factor $d/h$. For simplicity the error $d/h$ . $\delta$ will be neglected. During the time interval $t_7$ charge is transferred from the capacitor $C_1$ to the capacitor $C_2$. Simultaneously charge is transferred from the capacitor $C_{11}$ to the capacitor $C_2$. A charge of C. $(\Delta V - 2\,\delta)$ coulombs will flow from the capacitor $C_1$ to the capacitor $C_2$. A charge of $\delta$.C coulombs will flow from the capacitor $C_{11}$ to the capacitor $C_2$. As a result, the voltage across the capacitor $C_2$ will rise by an amount of $(\Delta V - \delta)$ volts, see FIG. 4*h*. The voltage across the capacitor $C_1$ will drop until it has become equal to $-(E-V_0 + \delta)$ volts. Hence, the error in the reference level across the capaitor $C_1$ will be equal to $\delta$ volts. During the time interval $t_8$ charge is transferred from the capacitor $C_1$ to the capacitor $C_{22}$. The voltage across the latter capacitor will rise by an amount of $d/h$ volts. During the time interval $t_9$ charge will be transferred between the capacitors $C_2$ and $C_3$ and between the capacitors $C_{22}$ and $C_8$. The voltage across the capacitor $C_3$ will drop until it has become equal to $-(E - V_0 + \delta)$ volts, see FIG. 4*h*. Thus, in this case also the error in the reference level will be equal to $\delta$ volts. If the said error of $d/h$. $\delta$ volts in the reference voltage across the capacitor $C_0$ is not neglected, a simple calculation shows that the error in the reference voltage across the capacitor $C_n$ will be equal to $\delta(1-n \cdot d/h)$ volts, where $n$ is the number of the capacitor under consideration. With, for example, $d = 1/300$, $h = 1/10$ and $n = 100$ the error in the reference voltage will be 1 percent and hence will be negligible. With $d = 1/300$ and $n = 100$, in the arrangement shown in FIG. 1 the error in the reference value will be 30 percent, which is unacceptably large.

In the embodiment shown in FIG. 3, in each storage stage the source of the transistor has been directly connected to the first capacitor. Alternatively, however, the source may be connected to the first capacitor through the main current path of a second field effect transistor. Further the source of the transistor of each of the auxiliary storage stages I, II and III may also be connected to the pertinent capacitor through the main current path of a field effect transistor. This ensures that the error in the reference voltage will be further reduced.

It will be appreciated that the invention is not restricted to the examples described and that to a person skilled in the art many modifications will be possible without departing from the scope of the invention. For example, both bipolar and field effect transistors may be used. Also, field effect transistors both of the enhancement type and of the depletion type may be used. Further, a substrate of low resistivity, for example 1 ohm, may be used and the channel length of the field effect transistors may be large, with a consequent additional reduction of the reaction. Moreover, the device described with reference to FIG. 3 may advantageously be used to realize a filter for electrical signals. In addition, the usual input and output circuits may be used in conjuction with the device described. Furthermore, at least two of the said devices may be connected in parallel so as to have common inputs and/or outputs.

What is claimed is:

1. A circuit comprising a plurality of serially coupled stages, each of said stages comprising a transistor having a main current path between at least first input and second output conduction electrodes, and one control electrode for controlling the conduction therein, each of said second conduction electrodes being coupled to the first conduction electrode of the transistor of the succeeding stage, a capacitive means having a first end coupled to said second conduction electrode and a second end, means for transferring charge from one of said capacitors to the succeeding stage capacitor comprising means for applying switching pulses to said second end of said capacitor and to said control electrode, thereby rendering said conduction path conductive, each of said stages except the first stages of said plurality of serially coupled stages further comprising auxiliary store means coupled to said first conduction electrode and to an input electrode said succeeding stage for storing charge from said capacitor after said transfer and for transferring said stored charge to the succeeding stage capacitor; whereby errors occurring during said first recited charge transfer are reduced.

2. A circuit as claimed in claim 1 wherein each of said transistors comprises second input conduction electrode, each of said auxiliary storing means being coupled to said succeeding stage second input electrode.

3. A device as claimed in claim 1, wherein the auxiliary store means comprises an auxiliary transistor having a main conduction path having first and second conduction terminals and a control input terminal wherein the current in the main conduction path is a function of voltage between said first conduction terminal of the main conduction path and the control input terminal, and a capacitor connected between the control input terminal and said second conduction terminal of the main conduction path, wherein the capacitance of the capacitor in the auxiliary store is smaller than the capacitance in the delaying stages.

4. A circuit as claimed in claim 1 wherein said applying means applies switching pulses of opposite polarity to adjacent stages.

* * * * *